T. A. EDISON.
Apparatus for Electric Lights.
No. 218,167.  Patented Aug. 5, 1879.
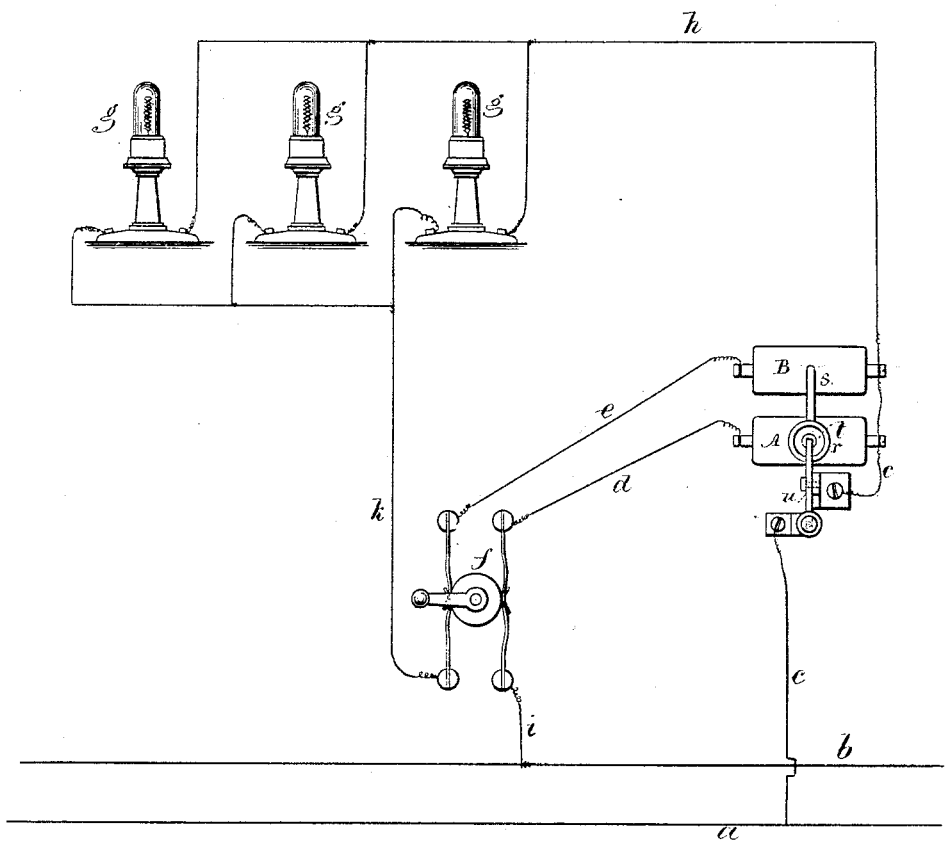
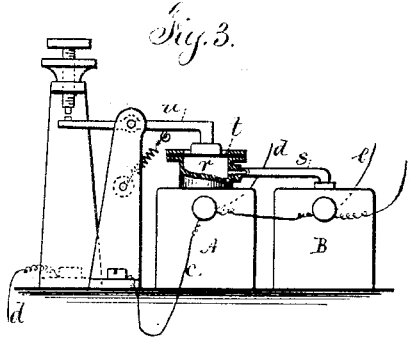
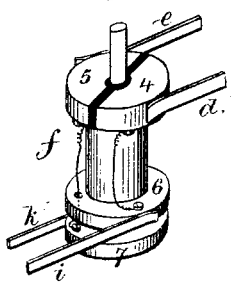

UNITED STATES PATENT OFFICE.

THOMAS A. EDISON, OF MENLO PARK, NEW JERSEY.

IMPROVEMENT IN APPARATUS FOR ELECTRIC LIGHTS.

Specification forming part of Letters Patent No. 218,167, dated August 5, 1879; application filed January 10, 1879.

*To all whom it may concern:*

Be it known that I, THOMAS A. EDISON, of Menlo Park, in the State of New Jersey, have invented an Improvement in Apparatus for Electric Lights, of which the following is a specification.

It is well known that an electric current passed through a secondary battery is stored up or reacts after the original current ceases, so that it can be used as a source of electricity.

I employ two secondary batteries, such as those known as the "Plante batteries." One of these is connected in the main circuit, and the same becomes charged. A circuit-changer is introduced in the circuits in such a manner as to connect this charged battery with one or more electric lights, and simultaneously throw the main circuit through the other secondary battery, to charge the same, after which that is connected with the electric lights, and the main circuit reconnected to the first secondary battery, and so on.

In the annexed diagram, Figure 1, the circuit-connections are illustrated, and Fig. 2 is a perspective view of the switch. Fig. 3 is a side view of the secondary batteries.

The secondary batteries A B are of any desired construction. I prefer, and use, two sheets of lead wound together into a square or cylindrical form, and immersed in acidulated water in a closed case.

The main line $a$ is connected with any magneto-electric machine or other source of electric energy, and $b$ is the return-line or earth-connection.

The main line $a$ is connected by the wires $c$ to the secondary batteries A B, and the return-wires $d$ $e$ pass through the switch $f$ and wire $i$ to $b$.

The electric lamps $g$ are represented in branch circuits between the wires $h$ and $k$. The wire $h$ connects to one of the secondary batteries A B, and the wire $k$ connects to the switch $f$.

The switch $f$ is preferably cylindrical, with two insulated half-cylinders, 4 and 5, against which the springs of $e$ $d$ rest; and from these half-cylinders are metallic connections to the insulated disks 6 and 7, respectively, against the peripheries of which the springs of $i$ $k$ rest, and this switch can be rotated periodically by a handle or by a clock-work or other suitable means.

When the switch $f$ is in one position the main circuit is closed through $a$, $c$, A, $d$, 4, 6, and $i$ to $b$, and the secondary circuit is closed from B through $h$, lamps $g$, wire $k$, switch 7 5, and wire $e$ to B.

When the switch $f$ is in the other position the main circuit from $a$ passes by $c$ to B, and by $e$, 4, 6, and $i$ to $b$, while the secondary circuit from A is by $h$ through lamps $g$, wire $k$ 7 5, and wire $d$ to A, so that when the secondary battery B is furnishing the accumulated electricity to the lamps $g$ the main current is charging the secondary battery A, and vice versa.

The switch $f$ may be actuated periodically by clock-work or any suitable mechanism.

When a secondary battery is fully charged, the decomposition of the liquid commences and gases are developed. I avail of this to actuate a circuit-regulator and disconnect the main current.

The two closed cases in which the secondary batteries are placed are provided with tubes $s$, passing to a chamber, $r$, beneath a flexible diaphragm, $t$; and in the metallic circuit $e$ there is a switch or lever, $u$, that is acted upon to break the electric circuit to the secondary batteries when the gases have accumulated sufficient pressure to move said diaphragm.

The accumulated gases combine, and in so doing maintain the electric action of the secondary batteries, and the pressure decreases, and the circuit is again closed by the lever $u$.

I am aware that gas has been produced by an electric current decomposing a liquid, and that the confined gas has been employed to move electrodes and regulate the main current.

I claim as my invention—

1. The combination, with electric lamps and a main circuit, of two secondary batteries and circuit-connections and switch, substantially as set forth, to alternately change the main and secondary circuits, substantially as specified.

2. The secondary circuit, containing electric lamps, and the secondary battery and inclosing-case, in combination with the main circuit through the secondary battery, a diaphragm acted upon by the accumulation of gas in the secondary battery, and a switch-lever in the main circuit, substantially as and for the purpose specified.

Signed by me this 31st day of December, A. D. 1878.

THOMAS A. EDISON.

Witnesses:
 WM. CARMAN,
 BENJ. D. ACKER.